Oct. 29, 1968          R. C. BRAMMER          3,407,901

STEP FOR CAMPERS, MOBILE HOMES AND THE LIKE

Filed April 26, 1967

INVENTOR.
ROBERT C. BRAMMER
BY
ATTORNEYS

United States Patent Office 3,407,901
Patented Oct. 29, 1968

3,407,901
STEP FOR CAMPERS, MOBILE HOMES AND THE LIKE
Robert C. Brammer, Traverse City, Mich., assignor to Stromberg-Carlson Products, Inc., a corporation of Michigan
Filed Apr. 26, 1967, Ser. No. 633,785
7 Claims. (Cl. 182—156)

ABSTRACT OF THE DISCLOSURE

A self-leveling step structure adapted for utilization in conjunction with a mobile enclosure, the height above the terrain of which may vary depending upon the terrain, carrying vehicle characteristics, etc. Two pivotable parallelogram-shaped support structures have the steps pivotably suspended therebetween in parallel fashion. The support structures are removably affixed to the structure at their front members only such that the structure may pivot to level the steps regardless of the vertical distance through which they extend. It is understood that this description will not be utilized to limit the scope of this invention.

Background

This invention relates to a portable step structure and, more particularly, to such a structure particularly adapted for utilization in conjunction with campers, mobile homes and the like.

Many differing types of mobile vehicles are currently available wherein an enclosure suitable for work, living or the like is mounted upon a wheeled chassis which may be either self-propelled or adapted to be propelled by a separate vehicle. The presence of the wheels beneath the enclosure, naturally, elevates the enclosure from the surface and, thus, it is desirable to provide some convenient means whereby persons may gain access thereinto with minimum ease and comfort. Preferably, the step structure utilized for this purpose is either removable from the enclosure or provided with means to swing or fold it out of the way during travel. If the steps are of a removable type, it is desirable that they fold or otherwise break down to as compact of configuration as possible in order that the working or living area within the enclosure will not be seriously restricted by their presence.

In the past, it has been customary to design step structures of this type for each particular type of mobile vehicle depending upon the height of the door above the ground, the peripheral position of the door and similar factors. This custom has produced a myriad of different types and models of steps which, although relatively suitable for utilization with the type of mobile enclosure for which they were designed, are virtually useless and, sometimes, even dangerous when it is attempted to utilize them in conjunction with other types of structures. For example, if a particular step structure has been designed to accommodate a vehicle having a door a certain height above the ground, the placing of that structure in operative relation to another type of vehicle having its door at a differing height results either in the steps being slanted or, alternatively, non-uniform vertical spacing between the steps and the floor of the enclosure. In the former case, persons are likely to slip and fall when ascending into or descending from the enclosure. In the latter case, of course, the natural climbing or descending rhythm of the occupant may cause him to miss the step when ascending into or descending from the enclosure with the possibility of serious injuries resulting.

Objects and specification

It is an object of this invention to provide a step of the type described which is not subject to the disadvantages outlined heretofore.

More particularly, it is an object of this invention to provide a device which may be utilized in conjunction with vehicles having their entry doors at differing heights without fear of accidents attributable to unlevel steps or non-uniform vertical rise.

It is an object of this invention to provide a device of the type described which may be easily placed in and removed from operative relationship with respect to the particular enclosure to permit its removal for traveling.

It is an object of this invention to provide a device of the type described which, when removed from the vehicle, folds into a compact configuration which is relatively light weight and, thus, may be easily lifted into the enclosure and stored there without seriously detracting from the amount of usable floor space therein.

It is yet another object of this invention to provide a device of the type described embodying a novel structural design which positively prevents any tendency for the back of the step to foul against downwardly hanging portions of the vehicle with respect to the enclosure to prevent any tendency toward tipping, falling or the like.

These as well as other objects of this invention will be readily understood by reference to the following specification and accompanying figures in which.

Briefly, this invention comprises a self-leveling step structure having a pair of pads or a planar bottom pad member adapted to rest upon the surface on which the mobile enclosure is parked. Extending upwardly from and pivotably affixed to the corners of the pad members are elongated front and rear support members. A step member is pivotably affixed at each of its ends to the adjacent front and rear support members in such a manner that the pad member, the support members affixed thereto and the pivotably associated step form the four sides of a pivotable parallelogram.

Detachable retaining means are associated with two of the support members and with the vehicle such that the step may be easily affixed into working position by merely hooking or otherwise fastening the retaining members in their mating supports. The step structure then pivots until the pad member or members abut the ground in level fashion and, because of the parallelogram-like characteristics of the structure, the steps retain their parallel relationship with respect to the pad.

Figure 1:
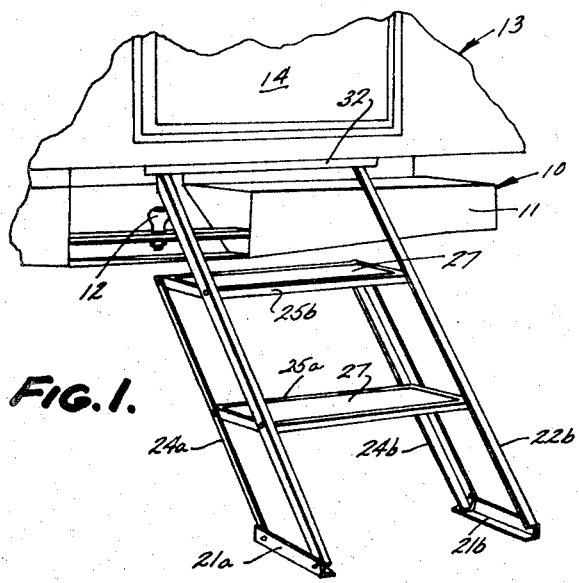
FIG. 1 is a fragmentary, perspective view of the novel step structure which is the subject of this invention attached to the rear of a pickup type camper.

Referring now to the figures, a preferred embodiment of this invention will be described in detail. Referring initially to FIG. 1, there is illustrated a conventional pickup type of vehicle having a chassis 10 with a rear bumper 11 and a trailer hitch 12. Mounted within the cargo-carrying box of the pickup is a conventional camping enclosure 13 having a door 14 facing rearwardly with respect to the vehicle.

Figure 2:
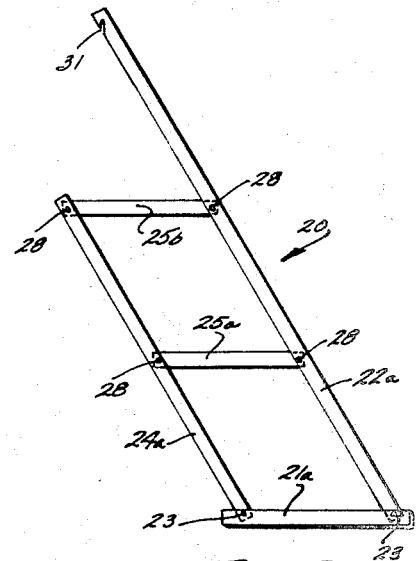
FIG. 2 is a side-elevational view of the step structure.
Figure 3:
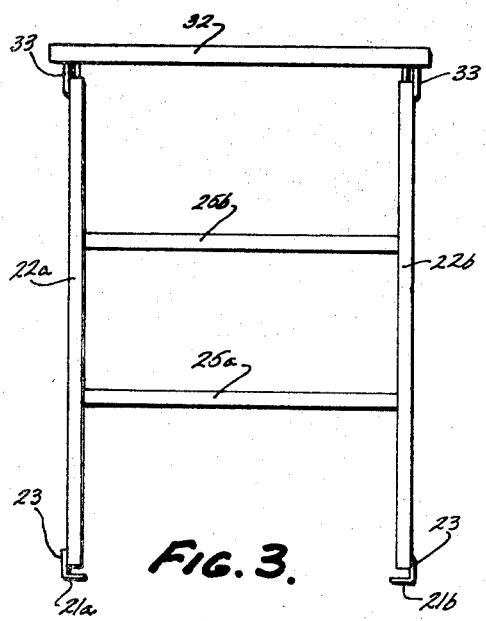
FIG. 3 is a front-elevational view of the step structure and associated attachment bar.
Figure 4:
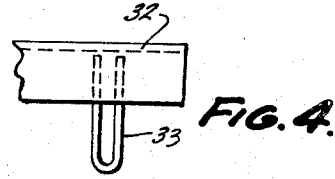
FIG. 4 is a fragmentary, front-elevational view of one of the depending attachment loops.
Figure 5:
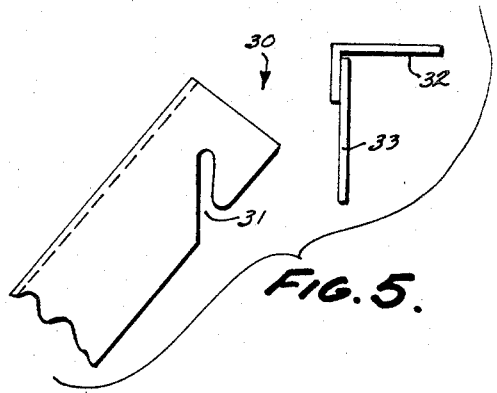
FIG. 5 is a fragmentary, exploded, side-elevational view illustrating the manner in which the step structure may be removably affixed to the enclosure for use.

Referring now additionally to FIGS. 2 and 3, the step structure 20 comprises a pair of pad members 21a and 21b having forward support members 22a and 22b and rear support members 24a and 24b affixed thereto. The support members 22 and 24 are pivotably affixed to the pad by any conventional means such as rivets 23. The forward and rear support members 22 and 24 may be fabricated, conveniently, from conventional angle stock.

Suspended between these support members and spaced above the pads 21a and 21b are a series of two steps, 25a and 25b. Each of the steps comprises a peripheral frame 26 having a nonskid grate 27 formed from expanded metal or the like affixed thereon. Each of the steps is pivotably mounted at its four corners to the forward and rear support members 22 and 24 as indicated at 28. The steps are positioned within the framework such that they lie in planes parallel to the plane of base members or pads 21a and 21b and, thus, the resulting configuration is that of a pivotable parallelogram between both the base members and the step 25a and the base members and the step 25b. That is to say, that as the support members 22 and 24 are pivoted with respect to the base members, the steps 25a and 25b always remain in planes parallel thereto and, thus, if the pads 21a and 21b are positioned on a relatively horizontal surface, the steps 25a and 25b will be likewise horizontal despite the angle between the base pads and the supports.

Referring now particularly to FIGS. 2 through 5, the removable retainer assembly 30 comprises a hook 31 formed in the upper extremity of each of the forward support members 22a and 22b. A base angle 32 is bolted or similarly affixed to the underside of the enclosure 13 in relatively permanent fashion. Affixed to the base angle 32 are a pair of depending loops 33 which, conveniently, may be fabricated from steel-rod stock and welded directly to base angle 32. The step structure 20 is affixed to the camper by merely hooking portions 31 of the forward support members over the loops 33. The steps structure is free to pivot about the loops until the base pads 21a and 21b lie flush with the ground or other surface.

Figure 6:
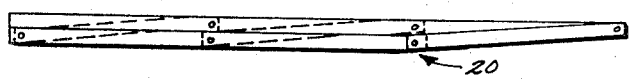
FIG. 6 is a side-elevational view of the step structure collapsed for transport and/or storage.

When the particular camping or work site has been reached, the step structure 20 is removed from the interior of the enclosure or other place of storage. The pivotal mountings of the base pads 21a and 21b and the step members 25a and 25b to the support members 22 and 24 allow the step structure to fold to the compact configuration shown in FIG. 6, when not in use and, thus, allow it to be stored without occupying an appreciable amount of otherwise usable space.

As the step structure 20 is lifted into position and the hooks 31 engage the loops 33 in retaining assemblies 30, the support members 22 pivot downwardly until their extremities abut the surface upon which the particular vehicle is resting. At this time or simultaneously, the pads 21a and 21b pivot with respect to support members 22 until they are resting flush with the surface and, thus are in a horizontal position. During this latter pivoting process, the rear support members 24 act as connecting rods causing the steps 25a and 25b to pivot with respect to forward support members 22 until they are also in a horizontal plane. Thus, despite the height of the loop 33 above the surface, the pivotable parallelogram nature of the step structure permits it to pivot until it is resting firmly on the ground and the steps are in a horizontal position. The distance between upper step 25b and the floor of the particular enclosure may be controlled by the positioning of support angle 32 so as to keep the vertical distance between each of the steps approximately equal.

Preferably, the rear support members 24 terminate their upward reach at upper step 25b. Such termination allows the assembly to swing beneath the particular chassis 10 and also prevents any tendency for it to foul against the bumper 11, the trailer hitch 12 or any other obstacle which might be on the particular vehicle in conjunction with which the step 20 is being utilized.

Once the visit at a particular site has been terminated, the step structure 20 may be removed for traveling by merely lifting the forward support members 22 vertically and pulling them away from engagement with the depending loops 33. The step may then be folded to the configuration shown in FIG. 6 and replaced in its storage area.

While the preferred embodiment of this invention has been disclosed as having two step members 25, it will be readily appreciated by those skilled in the art that any member of such steps could be supported between the support members 22 and 24. Similarly, other types of removable retaining means 30 might be substituted as is well within the purview of thoses killed in the art.

While a preferred embodiment of this invention has been described in detail, it will be readily apparent to those skilled in the art that many other embodiments may be conceived and fabricated without departing from the spirit of this specification and the accompanying drawings. Such other embodiments are to be deemed as included within the scope of the following claims unless these claims, by their language, expressly state otherwise.

I claim:
1. A self-leveling step structure particularly adapted for utilization in conjunction with a mobile enclosure, said structure comprising:
   a pair of pads adapted to rest on the surface on which said mobile enclosure is resting;
   elongated front and rear support members pivotably affixed to each of said pads;
   a step member pivotably affixed at each of its ends to said front and rear support members such that each of said pads, the support members affixed thereto and the pivotably associated step end form the four sides of a parallelogram whereby as said members are pivoted with respect to said pads, said step member maintains its parallel relationship with said pads; and
   hook means including slots formed in the upper extremities of two of the support members on opposite sides of said step member for removably affixing said support members to said mobile enclosure.
2. The structure as set forth in claim 1 wherein said rear support members are shorter than said front support members and said hook means are affixed to said front support members.
3. The structure as set forth in claim 1 wherein a plurality of said steps are pivotably affixed at each of their ends to said support members, all of said steps lying in parallel planes.
4. A self-leveling step structure particularly adapted for utilization with a mobile apparatus having wheels, an enclosure mounted on said wheels and, thus, elevated above the surface, and a door, said structure comprising:
   pad means adapted to rest on said surface;
   elongated front and rear support members pivotally affixed to said pad means, each said front support members being pivotable in the same plane as one of said rear support members and the two pivot planes thus described being parallel;
   a step member pivotably affixed at each of its corners to said front and rear support members such that the edges of said pad means, the support members affixed thereto and the pivotably associated step ends form the four sides of a pivotable parallelogram;
   first retaining means including slots formed in the upper extremities of two of the support members on opposite sides of said step member; and
   second retaining means including a pair of loops depending from and affixed to said enclosure adjacent said door, said second retaining means being adapted to removably receive said first retaining means.
5. The structure as set forth in claim 4 wherein said rear support members are shorter than said front support members and said first retaining means is affixed to said front support members.
6. The structure as set forth in claim 4 wherein a plurality of step members are pivotably supported by said support members in parallel fashion.
7. The structure as set forth in claim 6 wherein said rear support members terminate flush with the uppermost of said step members, said front support members extending thereabove and carrying said first retaining means.

References Cited
UNITED STATES PATENTS

| | | |
|---|---|---|
| 60,731 | 1/1867 | Hovey. |
| 300,395 | 6/1884 | Peterson. |
| 588,519 | 8/1897 | Welker. |
| 1,944,159 | 1/1934 | Bailey. |
| 2,498,375 | 2/1950 | Moore _____ 182—161 |
| 2,596,521 | 5/1952 | Bell. |
| 3,025,924 | 3/1962 | Smith. |
| 3,291,255 | 12/1966 | Glatfelter _____ 182—88 |

REINALDO P. MACHADO, *Primary Examiner.*